(12) United States Patent  (10) Patent No.: US 9,654,571 B2
Horton  (45) Date of Patent: May 16, 2017

(54) PUBLISH-SUBSCRIBE MESSAGING IN A CONTENT NETWORK

(71) Applicant: Time Warner Cable Enterprises LLC, New York, NY (US)

(72) Inventor: Gary Horton, Erie, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 220 days.

(21) Appl. No.: 14/160,261

(22) Filed: Jan. 21, 2014

(65) Prior Publication Data

US 2015/0207857 A1 Jul. 23, 2015

(51) Int. Cl.
*G06F 15/16* (2006.01)
*H04L 29/08* (2006.01)

(52) U.S. Cl.
CPC .................................. *H04L 67/16* (2013.01)

(58) Field of Classification Search
CPC ......... H04L 65/403; H04L 9/32; G06F 21/31; G06F 21/62; G06F 15/16
USPC .................... 709/204, 223; 713/165; 165/165
See application file for complete search history.

(56) References Cited

U.S. PATENT DOCUMENTS

| 7,792,963 | B2 | 9/2010 | Gould et al. | |
| 2003/0056217 | A1 | 3/2003 | Brooks | |
| 2003/0093680 | A1* | 5/2003 | Astley | G06F 21/445 713/183 |
| 2004/0205439 | A1* | 10/2004 | Carmeli | H04L 1/1848 714/748 |
| 2006/0130107 | A1 | 6/2006 | Gonder et al. | |
| 2006/0248176 | A1* | 11/2006 | McDowall | H04L 29/06 709/223 |
| 2007/0217436 | A1 | 9/2007 | Markley et al. | |
| 2009/0077124 | A1* | 3/2009 | Spivack | G06Q 30/02 |
| 2009/0248794 | A1 | 10/2009 | Helms | |
| 2010/0313236 | A1 | 12/2010 | Straub | |
| 2013/0024788 | A1* | 1/2013 | Olsen | G06Q 10/10 715/753 |

(Continued)

OTHER PUBLICATIONS

Wikipedia, Comet (programming), downloaded from http://en.wikipedia.org/wiki/Comet_(programming) on Jan. 15, 2014, pp. 1-6.

(Continued)

*Primary Examiner* — Tesfay Yohannes
(74) *Attorney, Agent, or Firm* — Otterstedt, Ellenbogen & Kammer, LLP

(57) ABSTRACT

A plurality of subscribers are registered to receive, from a publisher component, at client devices, via a broker component, at least one of messages and content pertaining to a first topic. Each of the subscribers is caused to generate one of N random numbers. A different one of the N random numbers is generated by each of the subscribers. Each of the subscribers is instructed to listen only for the messages and content pertaining to the first topic and corresponding to the corresponding one of the N random numbers. The at least one of messages and content pertaining to the first topic are published to those of the subscribers associated with each one of the N random numbers, number by number, until the at least one of messages and content pertaining to the first topic has been published to all of the plurality of subscribers.

16 Claims, 11 Drawing Sheets

(56) References Cited

U.S. PATENT DOCUMENTS

| | | | | |
|---|---|---|---|---|
| 2013/0198652 A1* | 8/2013 | Dunn | ................... | G06F 3/0484 |
| | | | | 715/751 |
| 2014/0282586 A1* | 9/2014 | Shear | ................... | G06F 9/5072 |
| | | | | 718/104 |
| 2014/0304505 A1* | 10/2014 | Dawson | .............. | G06F 21/6227 |
| | | | | 713/165 |
| 2015/0127937 A1* | 5/2015 | Ali | ..................... | G06F 21/6218 |
| | | | | 713/165 |
| 2015/0213284 A1* | 7/2015 | Birkel | ................... | G06Q 50/10 |
| | | | | 726/30 |

OTHER PUBLICATIONS

Apache ActiveMQ™—Index downloaded from http://activemq.apache.org/ on Jan. 15, 2014, pp. 1-5.
W3C, Offline Web Applications, W3C Working Group Note 30, May 2008, downloaded from http://www.w3.org/TR/2008/NOTE-offline-webapps-20080530/#related on Dec. 29, 2013, pp. 1-4.
Wikipedia, Publish—subscribe pattern, downloaded from http://en.wikipedia.org/wiki/Publish%E2%80%93subscribe_pattern on Oct. 21, 2013, pp. 1-5.
Wikipedia, Publish—subscribe pattern, downloaded from http://en.wikipedia.org/wiki/Publish_subscribe on Dec. 23, 2013, pp. 1-5.
Wikipedia, Server—sent events, downloaded from http://en.wikipedia.org/wiki/Server-sent_events on Jan. 15, 2014, pp. 1-3.
Wikipedia, WebSocket, downloaded from http://en.wikipedia.org/wiki/WebSocket on Jan. 15, 2014, pp. 1-6.

* cited by examiner

PUBLISH-SUBSCRIBE MESSAGING IN A CONTENT NETWORK

FIELD OF THE INVENTION

The present invention relates generally to communications systems and methods, and, more particularly, to publish-subscribe messaging and the like.

BACKGROUND OF THE INVENTION

Until fairly recently, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber networks (HFNs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like.

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

Publish—subscribe is a messaging pattern wherein senders (publishers) do not program the messages to be sent directly to specific receivers (subscribers). Rather, published messages are characterized into classes, without knowledge of subscribers, and subscribers express interest in one or more classes, without knowledge of publishers.

SUMMARY OF THE INVENTION

Principles of the present invention provide a system, method, and computer program product for publish-subscribe messaging in a content network. In one aspect, an exemplary method includes the steps of registering a plurality of subscribers to receive, from a publisher component, at client devices, via a broker component, at least one of messages and content pertaining to a first topic; causing each of the subscribers to generate one of N random numbers, a different one of N random numbers being generated by each of the subscribers; instructing each of the subscribers to listen only for the at least one of messages and content pertaining to the first topic and corresponding to the one of N random numbers generated by each corresponding one of the subscribers; and publishing the at least one of messages and content pertaining to the first topic to those of the subscribers associated with each one of the N random numbers, number by number, until the at least one of messages and content pertaining to the first topic has been published to all of the plurality of subscribers.

In another aspect, another exemplary method includes the steps of publishing, from a publisher component, to a plurality of subscribers at client devices, via a broker component, at least one of messages and content including a uniform resource locator pointing to a rules engine; obtaining, at the rules engine, from each of the client devices, a unique identifier of each of the client devices; and using the rules engine and the unique identifiers obtained from the client devices, determining particular messages and/or content to be delivered to each of the client devices.

In still another aspect, still another exemplary method includes the steps of listening, at an interceptor component, for at least one of messages and content pertaining to a first topic published from a publisher component to a plurality of subscribers at client devices, via a broker component, the least one of messages and content including a uniform resource locator of the publisher component; intercepting the at least one of messages and content pertaining to the first topic with the interceptor component; and re-publishing, with the interceptor component, to a second topic different than the first topic, identifying information for a destination subscriber for each of the intercepted at least one of messages and content pertaining to the first topic, back to the broker component for transmission to the publisher component, to inform the publisher component of the plurality of subscribers to whom the at least one of messages and content pertaining to the first topic was sent.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., an intermediary dynamic host configuration protocol relay device) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:

In the context of Incremental Rollout, Bandwidth management (manage traffic rates and target population to receive messaging) and/or reduced risk of rollback, and the associated impact on data center;

In the context of Content Confirmation, addition of filtering capability around message delivery to otherwise coarse-grained messaging topics, without reconfiguring the broker, server-side control around client topic subscription to dynamically support server concerns (vs. client topic interests), bandwidth management (reduce unnecessary network traffic), and/or efficiency—reduce unnecessary client-side efforts;

In the context of Notification Tracking, extend functionality of an opaque system (messaging broker) in a transparent, decoupled manner; i.e. gain visibility into when messages are sent from the system and/or subscribers to whom a message was sent; and/or services need not maintain, and keep in 'sync' (synchronization), a lengthy list of subscribers; they are given this information when it is needed, and then can discard it.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
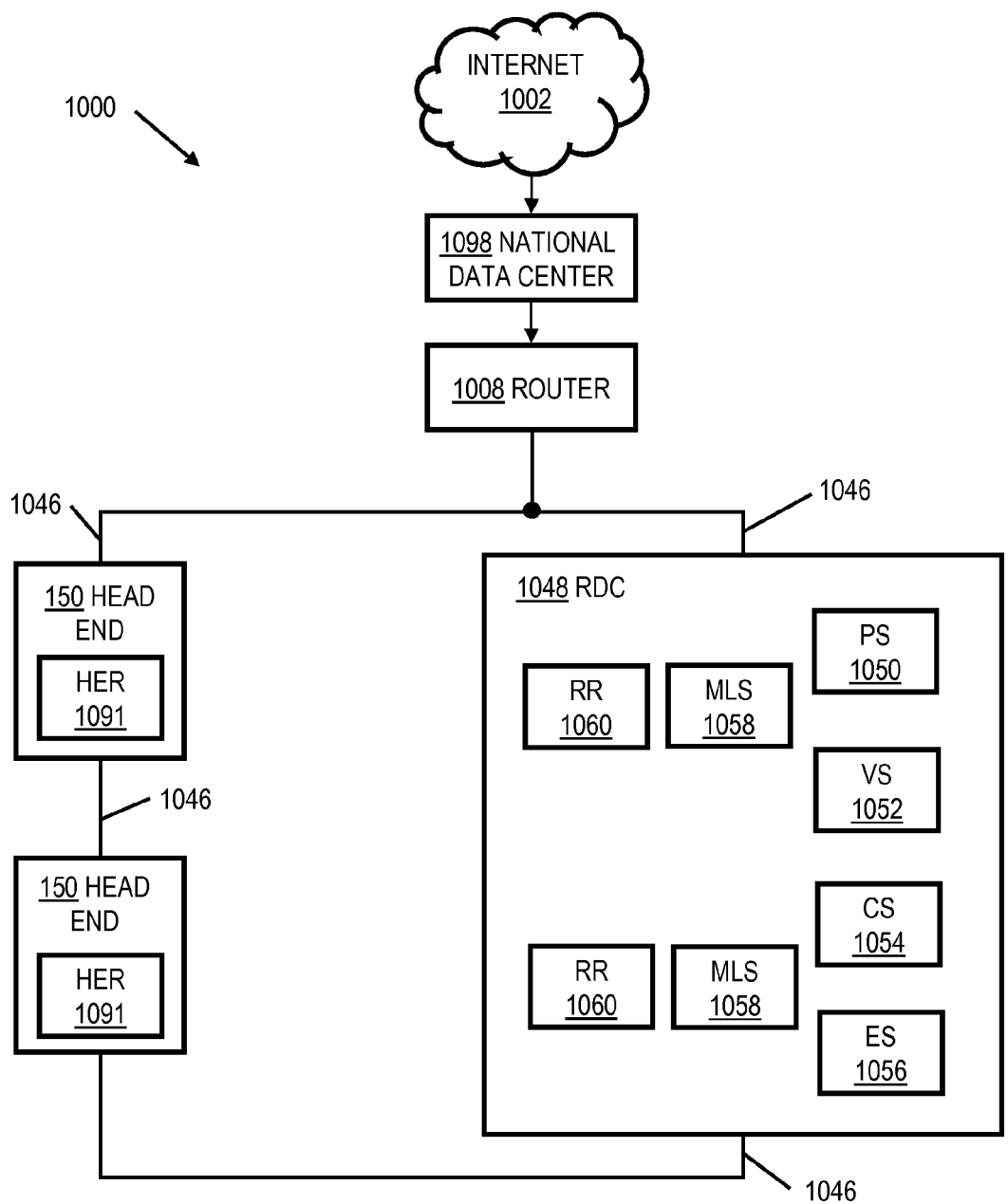
FIG. 1 is a block diagram of an exemplary embodiment of a system, within which one or more aspects of the invention can be implemented.

As noted, IP-based data services may be provided over a variety of networks. Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., U.S.A.

Head ends 150 may each include a head end router (HER) 1091 which interfaces with network 1046. Head end routers 1091 are omitted from figures below to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends and/or regional data centers. For example, such an NDC might include one or more VOD servers; switched digital video (SDV) functionality; gateways to obtain content (e.g., program content) from various sources including cable feeds and/or satellite; and so on.

Figure 2:
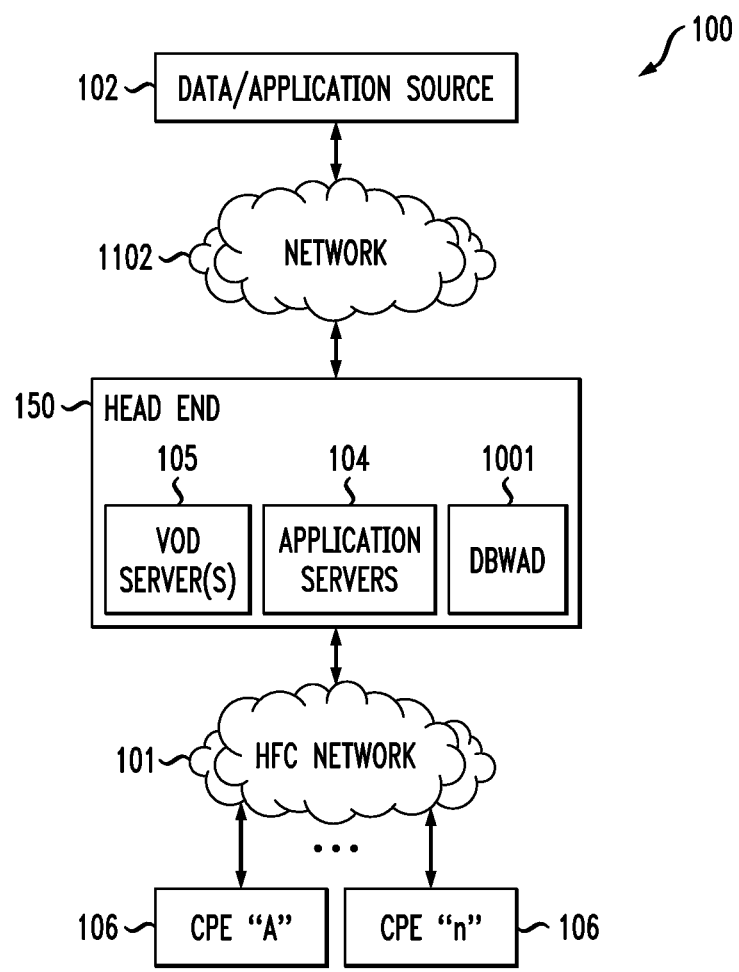
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes and high-speed cable modems for providing high bandwidth Internet access in premises such as homes and businesses.

Also included (for example, in head end 150) is a dynamic bandwidth allocation device (DBWAD) 1001 such as a global session resource manager, which is itself a non-limiting example of a session resource manager.

Figure 3:
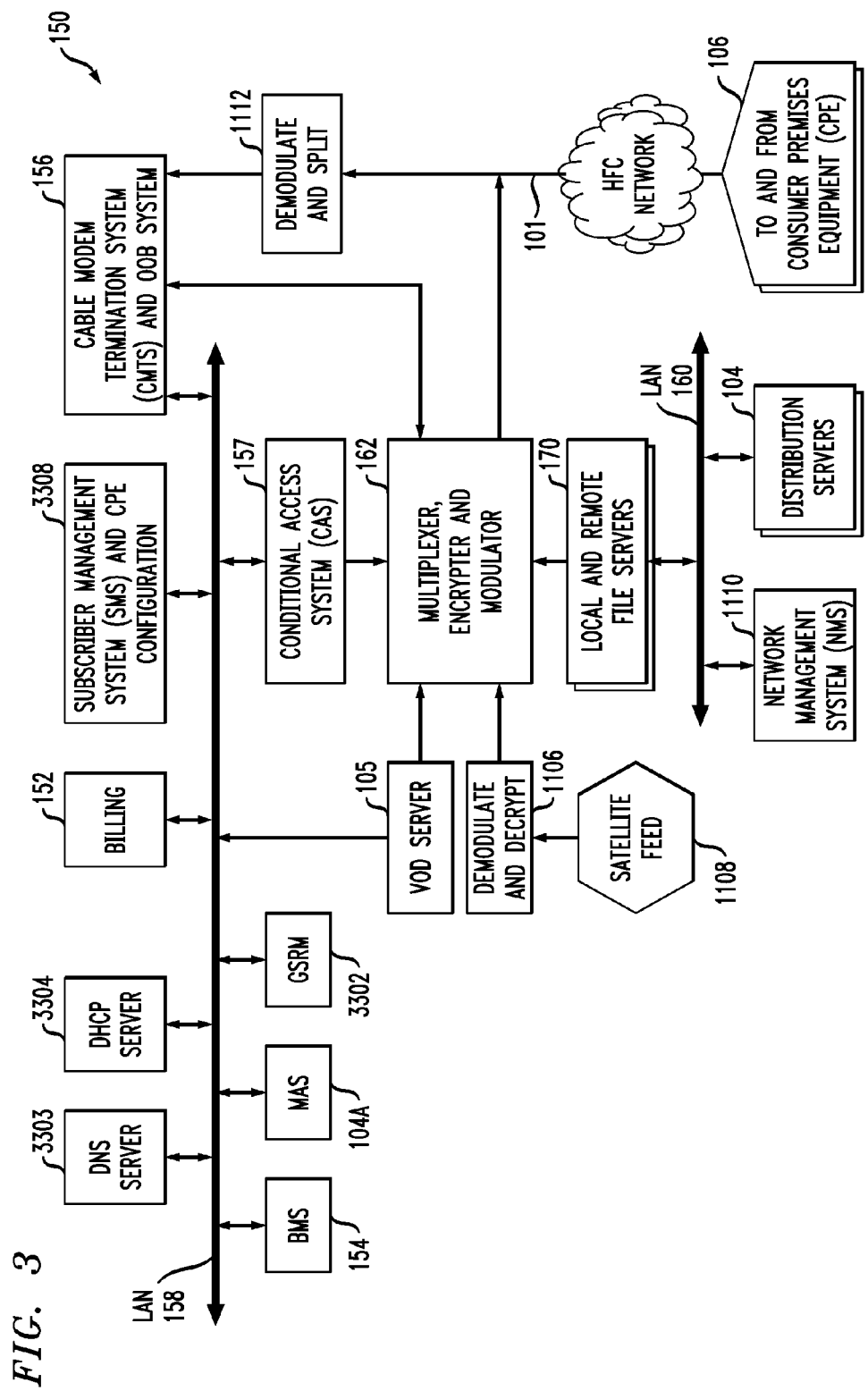
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, U.S.A.) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application of one or more embodiments. However, one or more embodiments are generally applicable to IP transport of data, regardless of what kind of functionality is employed.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more DHCP server(s) 3304 can also be located where shown or in different locations.

Figure 4:
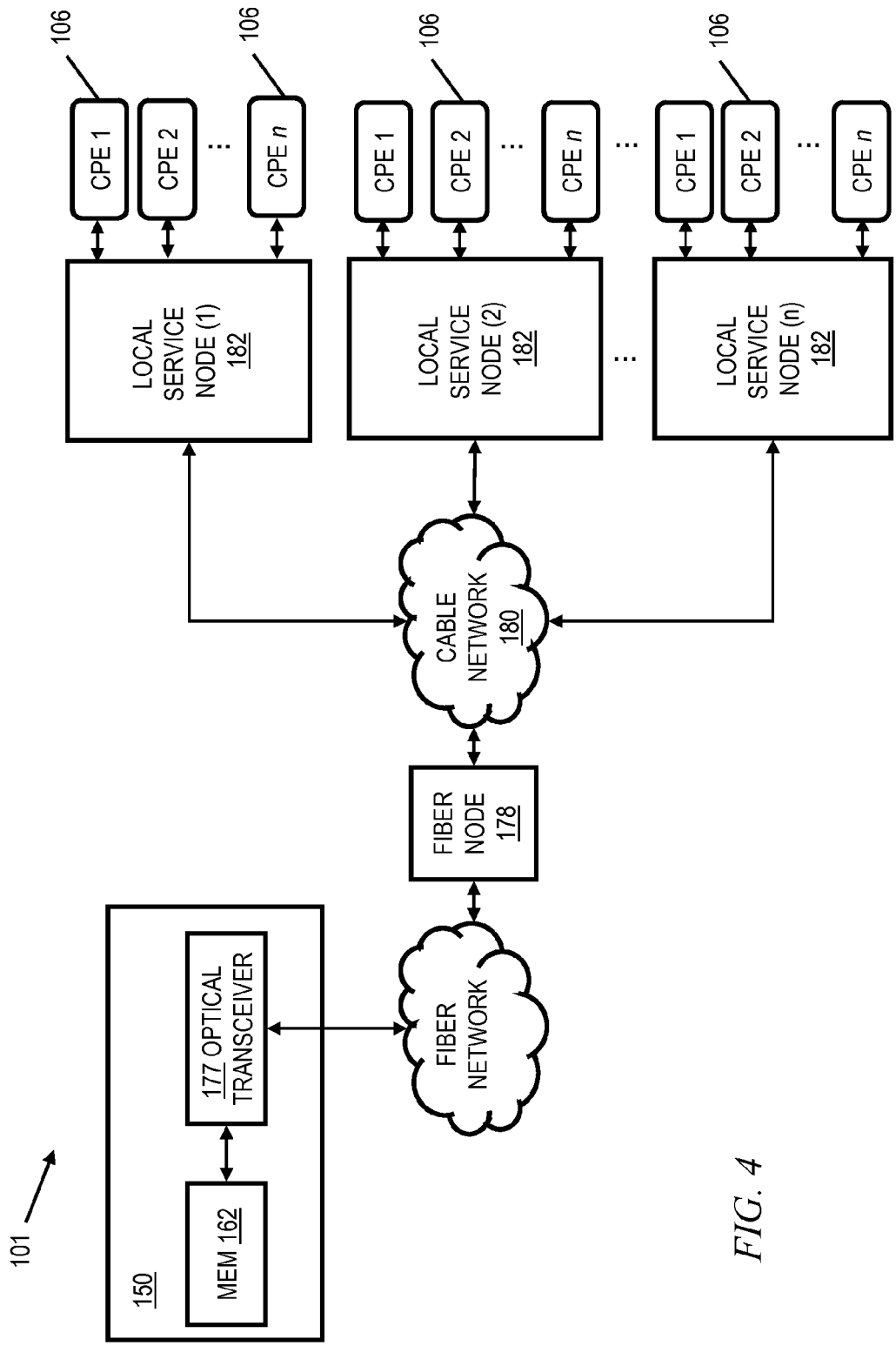
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number of CPE 106 per node 182 may be different than the number of nodes 182.

Certain additional aspects of video or other content delivery will now be discussed for completeness, it being understood that embodiments of the invention have broad applicability to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
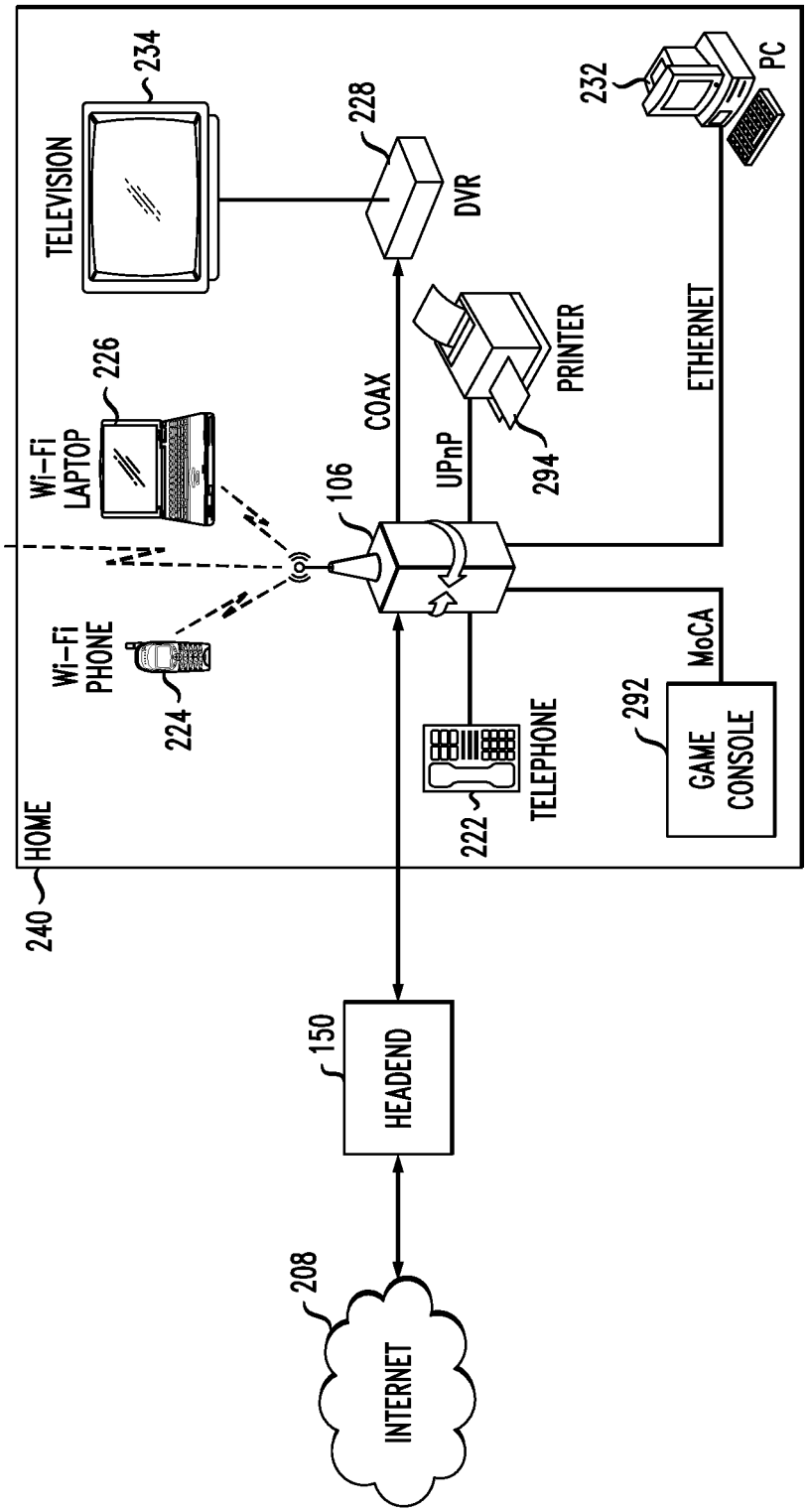
FIG. 5 is a functional block diagram of a premises network, including an exemplary centralized customer premises equipment (CPE) unit, interfacing with a head end such as that of FIG. 3.
Figure 6:
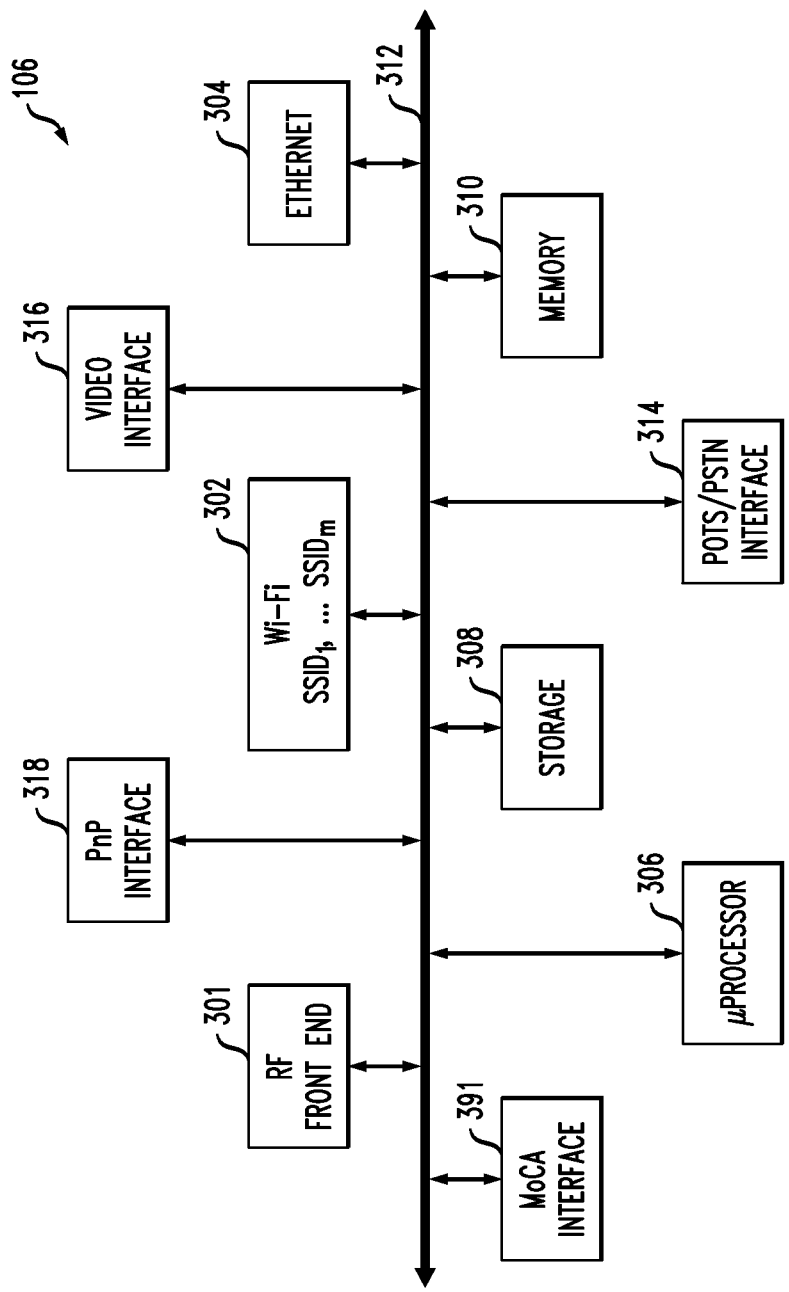
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Again, it should be noted that some embodiments provide a cloud-based user interface, wherein CPE 106 accesses a user interface on a server in the cloud, such as in NDC 1098.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments provide a cloud-based user interface, wherein CPE 106 accesses a user interface on a server in the cloud, such as in NDC 1098.

The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

In addition to "broadcast" content (e.g., video programming), the systems of FIGS. 1-6 also deliver Internet data services using the Internet protocol (IP), although other protocols and transport mechanisms of the type well known in the digital communication art may be substituted. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Figure 8:
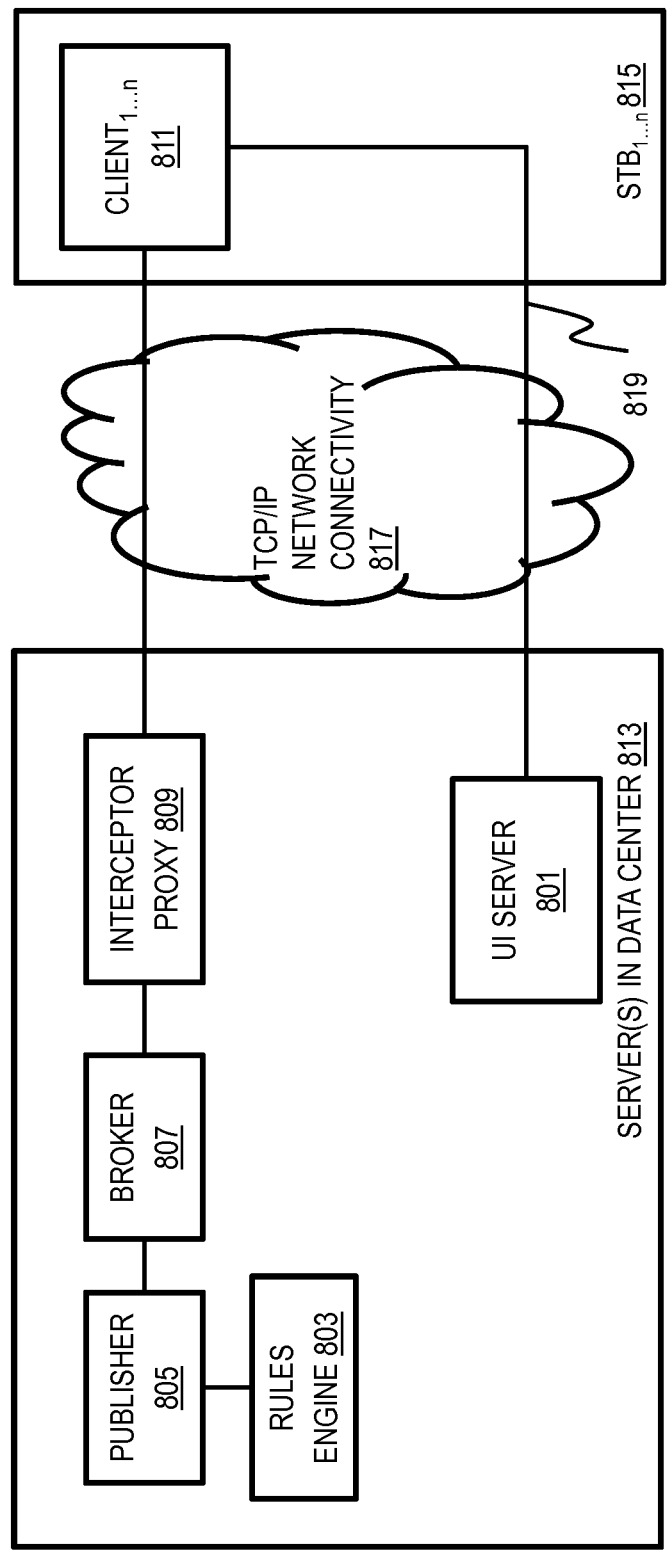
FIG. 8 is a block diagram of an exemplary system, in accordance with an aspect of the invention.

Embodiments disclosed herein are applicable in a variety of contexts. One or more embodiments are broadly applicable to publish-subscribe messaging in a content network. Non-limiting examples will be presented in the context of:
 a cloud-based user interface for a content network,
 incremental rollout,
 content confirmation, and
 notification tracking Some embodiments pertain to HNAV—hosted navigation—wherein the user interface (UI) resides in the cloud, as opposed to legacy systems, wherein a client is installed on an STB 106 in a customer's premises and navigation is local. Referring to FIG. 8, in one or more embodiments, a server 813 in data center 1098 or 1048 hosts a file (standard web technology html, JavaScript, CSS, XML, or the like) including the UI, as shown at 801. It will be appreciated that element 801 is a software server component whereas element(s) 813 represent one or more physical servers, with or without a virtualization layer, on which elements 801, 803, 805, 807, and 809 run. One or more embodiments advantageously allow changes to be made more quickly, using web technology, as compared to legacy systems. In some embodiments, management is centralized, providing a national context as opposed to a per-division context—for example, server(s) 813 are in NDC 1098 rather than RDC 1048.

An issue with the legacy model is that it does not permit the convenient provision of different versions of the navigation experience to the user—while different versions are possible, and are used, e.g., for beta trials, lead times on getting new versions are long, and in practice, a given division typically uses only one version. There is additionally limited space on the carousel for more than 2-3 versions at a time. Given these challenges, the use of multiple versions in the legacy system (within a given division) has generally been limited to smaller, time-boxed beta trials. One or more embodiments do not suffer from these deficiencies. For example, it may be desirable to roll out a beta version to a small sample of customers. Another scenario is to perform A/B tests, wherein the "A" version goes to one group (e.g., based on demographics or geographic location) and the "B" version goes to another. It is desired to determine which one works better. Some embodiments employ "targeted delivery," wherein the target is a group of customers. To implement this aspect, one or more embodiments include a mechanism to inform an application in the user's home, which employs browser technology, to update to a new version of the user experience. Other factors that might impact the UI version include geographic location (e.g., east versus west coast), cultural and/or demographic differences, speed and/or category of service for Internet connectivity, and the like (some UI features might only work well with adequate bandwidth).

Another significant advantage of the web-based approach, in one or more embodiments, is the ability to move the new UI experiences out to customers in a very timely manner. Yet another significant advantage is the ability to quickly roll changes back if a new release has an issue.

Referring again to FIG. 8, each set-top terminal or box (STB) 815 locally stores the appropriate uniform resource locator (URL) to access in order to obtain the appropriate UI for that box (note that one or more embodiments are not limited to a UI, but can also include other content such as software applications (e.g. a word processor), media (images, video streams), news feeds, stock ticker, and the like). The clients 811 are browsers running on n STBs 815. The parameter n is not necessarily the same as in FIG. 4. The clients know what URL to ask for using Hypertext Transfer Protocol (HTTP). This URL leads them to the user interface server 801, which returns the various files that comprise the user interface.

It will be appreciated that only a single client 811 on a single STB 815 is explicitly shown in FIG. 8; however, as suggested by the subscripts 1 . . . n, there may be n clients running on n STBs in m different premises (m≤n). Again, the parameter n is not necessarily the same as in FIG. 4.

In one or more embodiments, a publish-subscribe model is used wherein clients 811 on STBs 815 subscribe to listen for notifications regarding what URL should be accessed to obtain the appropriate content, e.g. UI files. In some instances, this is done in a targeted manner, to update just a desired set of customers.

More specifically, when it is desired to carry out an update, change the business rules on the server side via a rules engine 803 configured based on, e.g., region, or something more fine-grained than regions, such as zip code, state, or the like. Clients 811 may then be advised to listen for notifications using "filters", again not only on region, but also based on something more fine-grained, such as zip code (or other postal code) or state (or other geographical or political subdivision). In one or more embodiments, clients subscribe to a notification system using these filters. Update messages can be sent, for example, again with filters based on zip code (or other postal code) or state (or other geographical or political subdivision). In one or more embodiments, sub-dividing the recipients of content to a subset of subscribers using a particular topic-filter combination is possible.

In one or more embodiments, clients 811 subscribe for notifications based on a topic. The publisher 805 publishes information to a topic. A broker 807 in the middle provides the actual notification system. The broker 807 fans out the single message that came from the publisher 805 to all the listeners listening for (i.e., subscribed to) that topic. There are numerous advantages to this kind of architecture. The publishers and the clients are decoupled from each other—they do not need to know about each other—the broker 807 carries out the management. It is desirable to track the progress of the subscribers, so as to ensure that each customer has the correct software version or other content. The broker knows who the clients are, but the publisher does not. The publisher does not know to whom a given message is going.

One or more embodiments intercept the outbound messages from the broker 807 using an interceptor component 809 between the broker and each of the messages that go out. The interceptor allows each message to proceed, but takes note of it, and publishes a new message back to the very same broker 807, with that message identifying its destination client 811. An alternative approach is for the broker to expose an API which indicates to whom things are published. However, the former approach is preferred for architectural reasons, since such indication is not conceptually the responsibility of the broker.

Continuing, now, the publisher subscribes to the topic to which the interceptor will also publish, i.e., identifying each client that is sent a message. This permits explicit tracking of when the messages get sent, and the explicit list of subscribers to whom the messages have been sent, which provides more transparency into an otherwise opaque pub-sub system. One application of this is for the subscribers to send an acknowledgment to the publisher (whose URL could be included in the payload of each message) that they have received the message, and then acknowledge again when they have actually put the update in place. This allows the publisher to identify those subscribers that should have received the message, but did not; this is referred to as reliable update tracking, with the general mechanism referred to as notification tracking. This aspect combines the interceptor pattern with the mediator pattern (broker). Thus, in one or more embodiments the actors include the publisher, the broker, and the interceptor. In some cases, if, after a pre-determined amount of time, a client has not sent an acknowledgment to the publisher, the notification can be re-sent in a targeted fashion, i.e. explicitly to each such "straggler" using filters that identify that client uniquely (e.g. MAC address), assuming the client's subscription was done with that same filter.

To summarize, STBs 815 in people's homes have clients 811 running on them. There are a publisher 805, broker 807, rules engine 803, interceptor proxy 809, and a user interface server 801; these components collaborate to provide runtime instructions to clients 811 on the STBs, for example where to access the corresponding UI(s). Other than CPE (cable modem plus STB 815), everything else preferably is located in a national data center 1098. In a preferred embodiment, TCP/IP connections 817 are used between http client 811 and the publisher 805.

Note that in some instances, clients 811 may directly access UI server 801, as shown at 819, without use of the intermediate components. Furthermore in this regard, by way of clarification, in one or more embodiments, clients always access the UI server (or content server) directly; but in this set of mechanisms, clients are given the location (URL) of relevant content on the server. That is where the intermediate components facilitate things.

Figure 9:
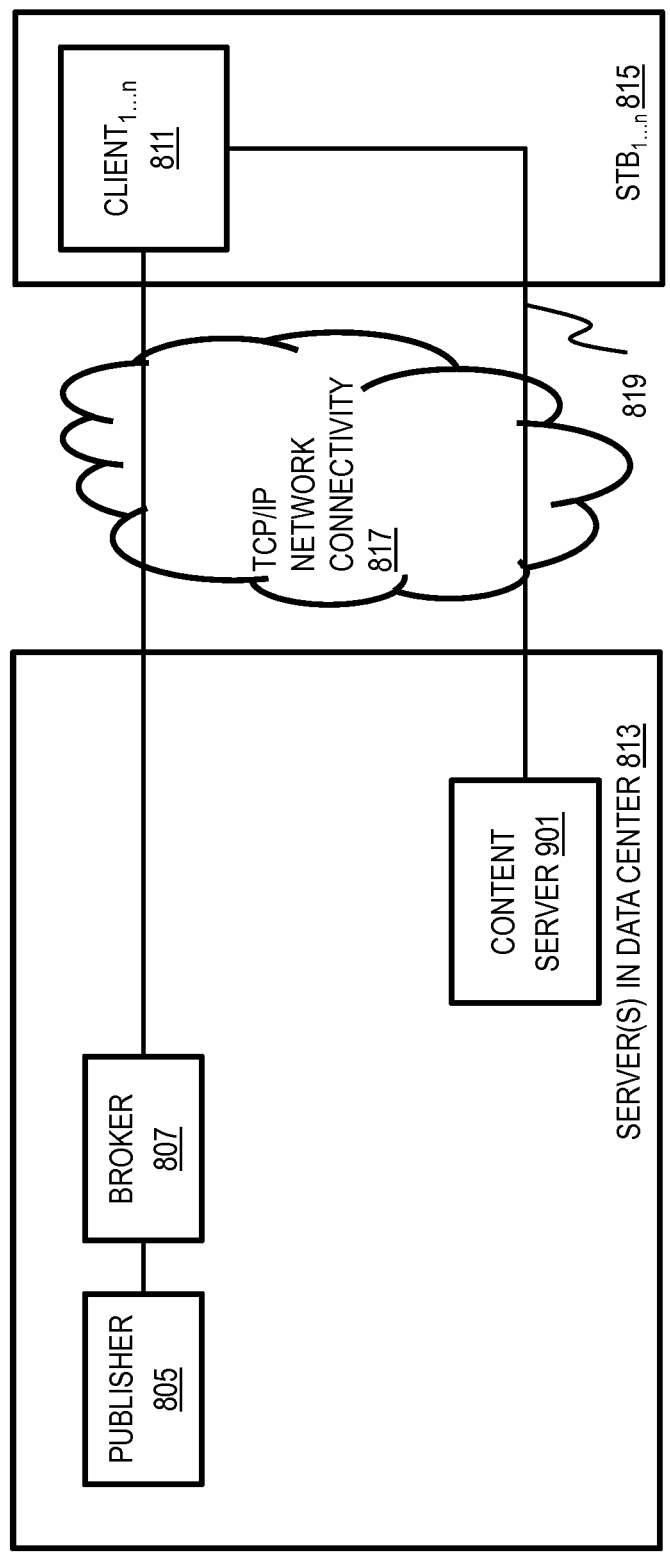
FIG. 9 is a block diagram similar to FIG. 8, but showing a subset of components useful in connection with an incremental rollout aspect.
Figure 10:
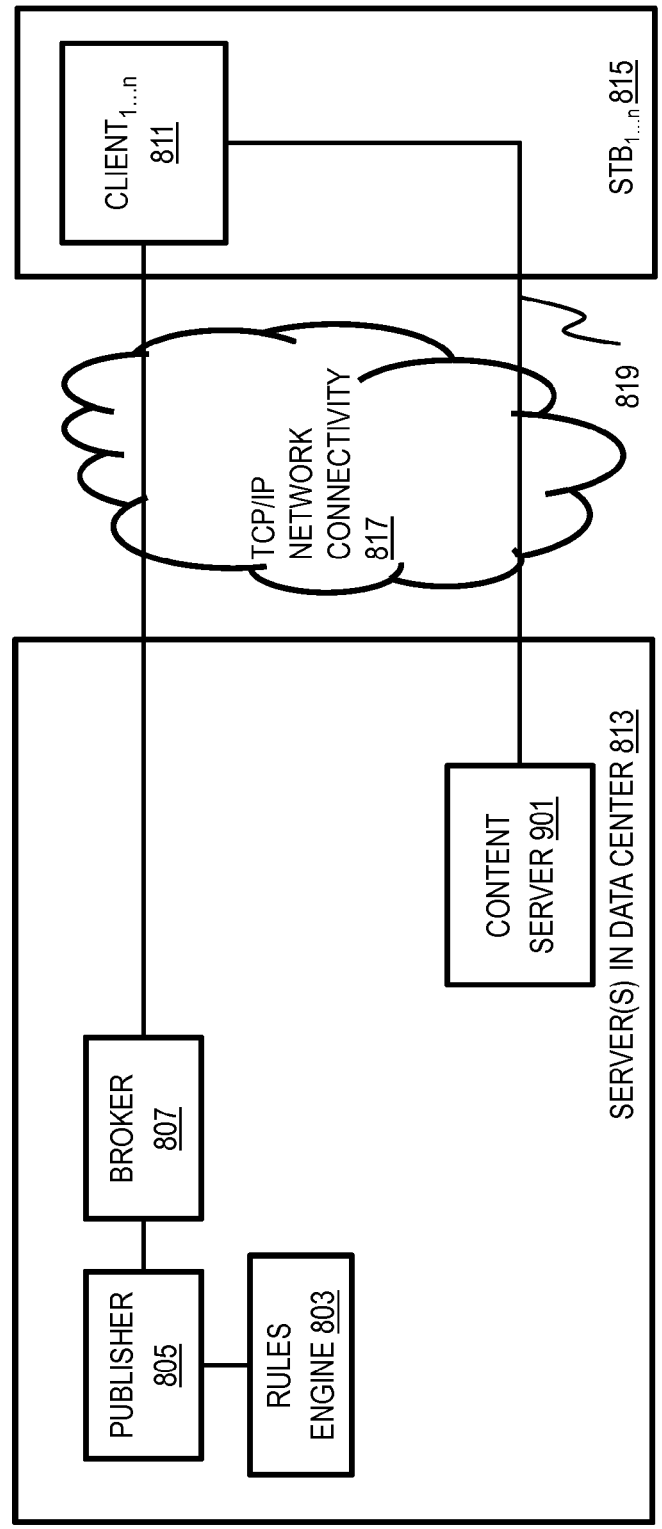
FIG. 10 is a block diagram similar to FIG. 8, but showing a subset of components useful in connection with a content confirmation aspect.
Figure 11:
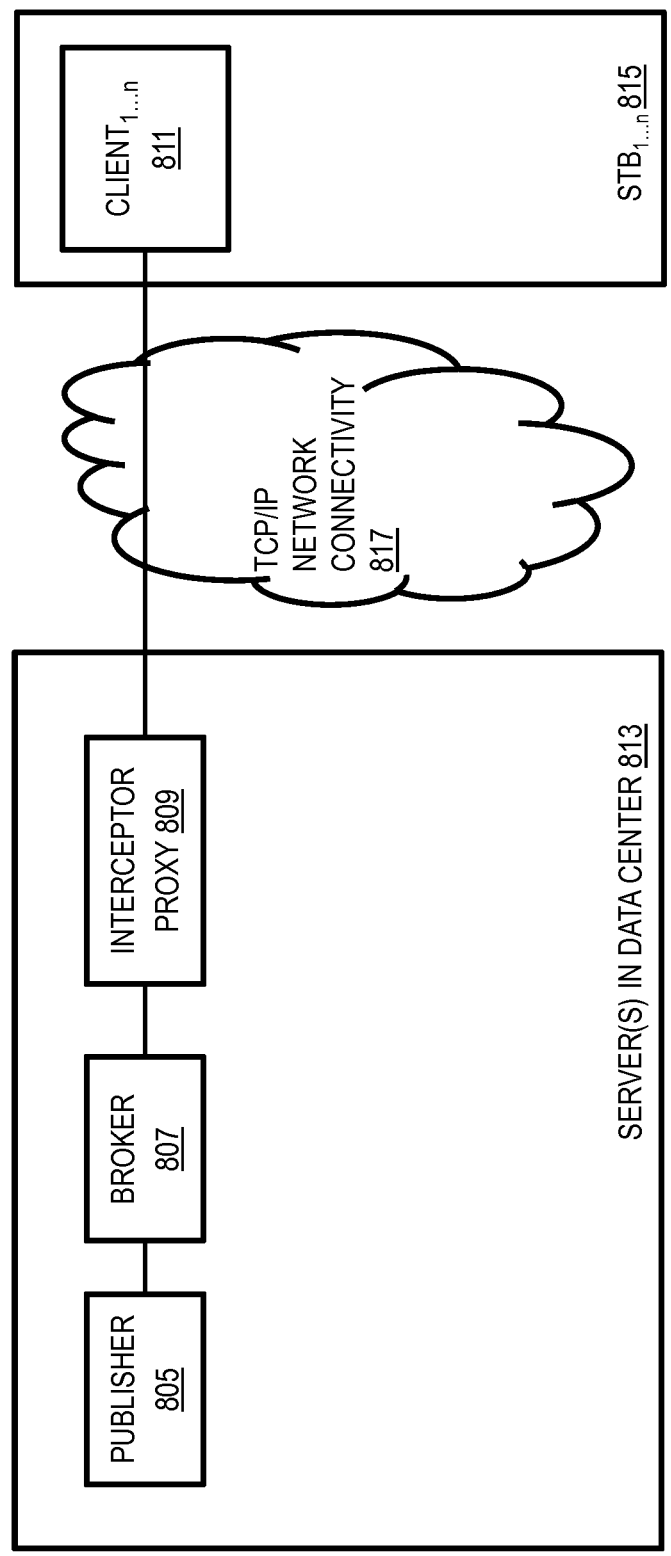
FIG. 11 is a block diagram similar to FIG. 8, but showing a subset of components useful in connection with a notification tracking aspect.

Note also that every embodiment need not necessarily have all of the components 801, 803, 805, 807, 809. FIGS. 9-11 show embodiments with only some of those components, which could be used for UI in the cloud or other applications.

To re-state the situation, a number of STBs 815 with clients 811 are in the premises of consumers. In legacy systems, the user interface to access content on a content network, such as a video content network, was downloaded to the STBs. In contrast, in one or more embodiments, the UI is located in the cloud. The UI is in the form of one or more files that are available using web technology by having the client(s) 811 access the correct files using URLs, as shown at 801. Each client could access the same URL; however, an advantage of one or more embodiments is allowing clients to access different URLs, and thus, different UIs. For example, this could be done to provide different UIs to different demographic groups, geographical locations, etc. It could also be done for purposes of gradually rolling out a new UI (or any other type of software, e.g. a particular spreadsheet, email client, word processor, etc., to be distributed to all employees within an organization).

Rule engine 803 applies business logic to determine which UI (e.g.) should be experienced by each client 811. It informs publisher 805 exactly what information to send in message(s) to the clients 811 to tell clients 811 to access the correct URLs. Publisher 805 sends appropriate messages using a publish-subscribe model. Publisher 805 creates messages based on topic; it does not need to know which clients 811 correspond to that topic. Broker 807 intercepts the single message from publisher 805 and re-routes it to all of the correct client(s) because broker 807 knows which topics are associated to which clients, based on which topic(s) each client 811 has subscribed to. The clients 811 are thus the subscribers in the publish-subscribe model. Optional interceptor proxy 809 intercepts the relayed messages destined for clients 811 and records the identities of the actual clients. Interceptor proxy 809 then acts as a publisher for this information, and publisher 805 acts as a subscriber. This allows publisher 805 to track the clients 811 that were sent a message, and if those clients send an acknowledgment to the publisher, it can "reliably" track the UI updating process. The client stores the appropriate URL and accesses that URL to obtain the correct UI whenever the corresponding STB 815 boots up.

Thus, publisher 805, as informed by business rules in rules engine 803, publishes messages which are obtained by clients 811 with the help of broker 807; these messages tell the clients what URL to access to obtain the correct UI. In some embodiments, the UI files are on the UI server 801. Once a client 811 has the correct URL, it will, in one or more embodiments, access that URL on server 801 directly, as shown at 819, without passing messages through components 805, 807, and/or 809. The components are connected using TCP/IP connectivity, as suggested by cloud 817. The components 801, 803, 805, 807, and 809 are software components running on one or more physical servers 813 in a node of a video content network, which is remote from the premises wherein the STBs 815 reside. For example, the node may be a data center of the video content network, such as a national data center 1098.

TCP/IP network connectivity 817 may be provided, for example, over an HFC cable plant using a cable modem in the premises where the STBs reside, and appropriate components as shown in FIGS. 1-6.

As noted above, in addition to the cloud-based UI embodiment, aspects of the disclosure can be used in a wide variety of contexts, for example provision of messages and/or content other than cloud-based UIs. Regardless of whether the messages and/or content include cloud-based UIs or something else, one or more embodiments can provide one, some, or all of the following:

1. Incremental Rollout
2. Content Confirmation
3. Notification Tracking

Again, the UI discussed above is a non-limiting example of content; other non-limiting examples include "sports" and "weather," as the content as opposed to the "version" of a given UI. However, the principle is similar. In the "sports" and "weather" case, the UI Server w/URL 801 is more generally a content server 901 (FIGS. 9-11) to serve static messages or stream content. Note that the UI Server 801 or content server 901 is optional, depending on the nature of "content" delivered to the clients 811. The UI example above describes the HTTP delivery of what is effectively a website, viewed as a UI for video (or other content) customers. That context is non-limiting, and embodiments are broadly applicable to many different kinds of content. For example, consider the delivery of messages (in the form of Emergency Alert System (EAS) weather alerts) and streaming content (in the form of sports broadcasts). Either of these can be retrieved from a "content server" 901 (to generalize the "UI Server" notion) by the publisher or directly by clients, or can be delivered indirectly to the clients from a publisher through a broker. Thus, some embodiments omit servers 801 and/or 901. When streaming content is what is delivered, it is intuitive to think of the "topic" as a "channel"; this terminology is employed below. It is worth noting that in one or more embodiments, a "content server" is passive, i.e. it does not "push" information; it simply exposes an application program interface (API) for others to "pull" the content, whereas, a publisher does "push"—to clients by way of a broker.

In typical publish-subscribe architectures, clients 811 subscribe to a topic exposed by the messaging broker 807. The broker knows nothing about the types of messages that will be sent to the subscribers. Deployed in the data center with the broker, publishers 805 (services that support business logic, enforce business rules, etc.) from time-to-time send messages to the broker 807. These publishers 805 are explicitly aware of the messages sent but know nothing about the clients. Hence, the broker 807 mediates these communications and facilitates the decoupling of services from clients. It is worth noting that in one or more embodiments, the rules engine establishes the rules and makes them available for lookup, by publishers or by any other component—the rules engine per se is passive; however, the publisher (and other agents that use the rules engine) "enforce" the rules by actively applying them.

One or more embodiments advantageously support numerous versions of a given web-based software package used by browser-based clients. Some embodiments provide targeted delivery to control distribution, wherein specific (groups of) clients are notified to use a particular version of a package. Some embodiments provide such targeted delivery in a scalable, reliable manner.

Each collection of clients using a specific version of a UI or other software or the like can be thought of as a "target."

In some embodiments, the client checks with the rules engine to make sure it loads the correct version (e.g., of a UI) on each power-on, to provide reliability, and the ability to update the version for given group of customers is provided (targeted delivery).

The skilled artisan will appreciate that there are a variety of techniques that, given the teachings herein, can be used to provide notification over HTTP; non-limiting examples include long poll, web sockets, and server-sent events.

In some embodiments, clients provide zero or more filters (e.g. their geographic region, service level, etc.) to the topic subscription. For example, if the topic is update-content (i.e. "notify me when new content (e.g. the UI) is available"), publishing with particular filters allows for notifying clients in a given geographic region, with different service levels, and the like. The client may filter, for example, by the version currently being run, to support notifying clients running version "A" to update to version "B." One or more embodiments provide a decoupled architecture, wherein clients do not know about services and services do not have a list of clients—communication is brokered by topics instead. One or more embodiments provide scale and design advantages since services do not need to maintain a client list. In some instances, a service publishes one message to a single topic, which is fanned out to many clients by the broker. In some cases, the broker is open source (OS) or Commercial Off-The-Shelf (COTS) software that is already designed for scale, and services uses zero or more of the same filters as used by the clients when publishing to the topic, to support messaging on a finer-grained basis. In one or more embodiments, clients are network-connected to receive the message. One example of broker software is Apache ActiveMQ™ software from The Apache Software Foundation.

Incremental Rollout

Some embodiments create subsets among a group of customers (which is viewed at a business level as an indivisible group) to support rolling out new versions of software or the like in an incremental manner, to subsets of client machines at a time. Each customer's client machine is instructed to choose a random number within some range, and to subscribe to messages with a filter using that number, such that they will receive only those update messages that are published using that particular number as a filter. The server proceeds with the updates incrementally, addressing each subset of clients filtered by each number in the range sequentially. This allows the server to manage bandwidth constraints for large customer populations, and minimizes the risk of needing to roll back a large client population (since application stability can be determined over time, before too many subsets are updated).

Referring now to FIG. 9, in this aspect, the subscribers 811 listen for messages or content on a given "topic" (which can also be thought of as a "channel"), e.g. "Dodger Baseball." Please note that elements in FIGS. 9-11 with the same reference character as in FIG. 8 are similar thereto; also, as noted, content server 901 is a more generalized version of UI server with URL 801. The publishers 805 may, at first, send out all messages related to all sporting events to that single topic and/or channel. But the data center may not have the capacity to send that much data all at the same time to all customers. In one or more embodiments, the publishers of the sports information advantageously send it in manageable increments at a time to manage bandwidth; but they are currently capable only of sending to a single channel, and therefore to all subscribers at once, since all subscribers are listening on that channel. Furthermore, the publishers do not have explicit knowledge of each subscriber to have the desired control (only the broker 807 has the list of subscribers). One or more embodiments advantageously provide the ability to deliver content incrementally to subscribers that are all listening on a single channel. In the embodiments of FIG. 9, only a content server 901, publisher 805, broker 807 and clients 811 are used (as compared to FIG. 8).

The publisher knows the overall customer population P, and it knows its preferred increment size S as per bandwidth constraints; thus it is able to compute the desired number of increments N where N=P/S. Each client 811 sends a message to the publisher 805 on startup, indicating that it is running, and this is when the value of N is provided from the service to the client 811 in response to that message. Each client then generates a random number between 1 and N, where N is the number of increments preferred by the publisher; the client then adds a filter with the value of N to its subscription for update-content messages.

Subsequently, a given's subscriber 811 listens for messages and/or content sent to topic=update-content AND increment=m, where 1≤m≤N, i.e. this is the random number generated by the subscriber. With this functionality in place, the publisher can now publish with the same filters, e.g. to "topic=update-content AND increment=1," "topic=update-content AND increment=2," and so on, until all such increments are covered. The publisher 805 now has control over not only the size of each increment, but also the "pause time" between each increment, thereby managing bandwidth as needed. This mechanism provides "incremental rollout."

Furthermore with regard to incremental rollout, suppose a large number of customers have been given the same version of software. It is desired to roll out a new version of the software to all the customers. The large number of customers may in turn lead to bandwidth concerns. Furthermore, if an issue is discovered, it may be desirable to carry out a rollback. It may be desirable to minimize the risk that a large number of people will need to be subject to the rollback and/or the risk that a large number of people will be unhappy with their service because of the issue. Incremental rollout addresses these issues: bandwidth is managed by only rolling out the new software to a limited number of customers at a time. Furthermore, proper functioning is verified during the pause time, before rolling out the software to any additional customers. This helps to raise confidence in the new version before rolling it out to additional customers. As confidence increases, subsequent increments in the roll-out may be undertaken more quickly (with less pause time), including concurrent execution of multiple increments instead of one at a time.

In one aspect of incremental rollout, everyone eventually transitions to the same new version. In other cases, different people end up with different versions (see, e.g., discussion of Content Confirmation below). Each STB 815 locally stores what URL to access in order to obtain the proper UI or other software.

One or more embodiments employ web technology wherein the clients are browsers running on n set top boxes 815, and require a URL to the UI to be run in that browser (or URLs to other content feeds to be displayed in the browser). The clients know what URL to ask for using http. This URL leads the clients to the appropriate UI or content server 801, 901. That server returns the various files (or streams) that comprise the user interface (or other software, content feeds, etc.). Other embodiments can use different approaches.

Content Confirmation

Some embodiments address subdivision of a group of customers (which is viewed at a business level as an indivisible group, defined by the topic-filter combination to which customers have subscribed) to support rolling out new versions of software or the like to the smaller group, instead of being constrained to updating either all or none of the members of the original group. This happens when the business criteria used to determine the customer version are narrowed, e.g. the set of criteria originally is by region (e.g. West, East, Midwest), but then is altered to include State or other geographical or political subdivision, or Zip Code or other postal code. Client machines only listen for messages as per their criteria, and these new criteria have not yet been applied to existing subscriptions, so one or more embodiments (1) change the criteria for which clients listen in business rules, (2) send update messages (or the like) to all clients subscribed to the topic-filter combination of interest (which resulting group can possibly include clients that do not need to update), and (3) minimize client restarts and/or reloads to just those that actually need to update, by instructing them to check with the server to confirm their version of software (e.g.) is or is not current. Only those clients that are not "current" will execute a restart (or download, etc.) to acquire new software version or the like.

For example, assume a topic of "update-sports" associated with various sports feeds, e.g. for "Dodger Baseball", "Prep Sports" and the like. The topic provides a notification to clients that the available content feeds may have changed. Clients must confirm with the publisher that they need to take action or not after this notification is delivered.

Referring to FIG. 10, in this aspect, the publishers (services) 805 may also wish to provide clients subscribed to "update-sports" with different sports feeds, based on not only customer's location, but now their service level with company, and additional criteria that are not yet in use as filters in existing subscriptions, and as such would not be effective as filters applied to publishing of messages. In one scenario, location-specific content (e.g. Prep Sports) would be delivered to a subset of the existing group of customers subscribed to sports. Here again, with current techniques, publishers are not able to adjust the members of the existing group because of the decoupling between services and clients and the absence of appropriate filters in subscriptions to match the new business criteria. One or more embodiments advantageously provide the desirable sub-setting via a "content confirmation" protocol and with use of rules engine 803, adding these aspects to the incremental rollout components. Note that each of these three mechanisms can be used in isolation, or they can be "mixed and matched" as needed.

In this aspect, a message is published to a topic on the broker 807 (sports, e.g.), and the message is fanned out as usual from the broker to each subscriber 811 on that topic. The message additionally contains a URL back to rules engine 803; the subscriber uses that URL to check for additional (or substitute) content, depending on the customer's location, and the like. The subscriber in this case reacts to the message by sending uniquely identifying information (e.g., media access control address (MAC address)) to the rules engine 803 at the given URL. The rules engine has enough information from other back-end systems (billing, marketing, and the like—see, e.g., FIG. 3) to determine all needed customer attributes from the MAC address, which attributes are inputs to the rules engine 803 to determine the additional (or substitute) content the given customer should receive. Prior to this flow, administrators will configure the rules engine to reflect new business policies regarding what customers should receive what content. These determinations can be based on customer attributes such as location, broadband internet service tier, the customer's own stated preferences, and the like; all of which information is stored in the back-end systems (see, e.g., FIG. 3) and sourced by the rules engine 803, but which may not yet be in use as filters in client subscriptions to topics. The customers impacted by the new business policies may be a subset of an original group subscribed to the update-sports topic with particular filters, hence the need to construct another mechanism beyond topic and filter.

In one case the rules engine 803 responds to the content confirmation message with a list of location-specific (e.g. Southern California prep sports) content feeds (since the rules engine had information on the customer's location). The subscriber 811 then compares its current list (which it has stored during initial startup) to the given list, and initiates acquisition to those feeds not already in use (if any). This effectively subdivides the original group into subsets based on the rules engine's knowledge of the subscriber 811 location, since only a subset of all subscribers will need a particular location-specific feed.

In a second case, the rules engine response contains the very same content feeds that the customer is already receiving, indicating no action needed by that subscriber. Having each subscriber "confirm content" prevents any client actions (e.g. restarts, downloads, etc.) when this is not needed. For example, not all update-sports subscribers should get prep sports; for example, if one or more of such customers have established custom preferences that exclude prep sports entirely, or have narrowed their sports interests to "Major League baseball only." The rules engine in this case has access to those preferences as part of its determination.

In one or more embodiments, clients that take action (when their stored content information doesn't match exactly with what is given) must subsequently replace what has been stored with the new content information. This facilitates subsequent content confirmation exchanges.

Use of the rules engine advantageously enforces "who gets what"; hence the advantage for each subscriber to "confirm content" that he or she is entitled. These mechanisms provide "sub-setting"

It is worth noting as an aside that it is desirable to avoid disrupting people's TV-watching when upgrading their UI experience. Thus, it is advantageous to avoid not only wasted bandwidth but also disruptive unnecessary UI changes within HNAV (e.g., unnecessary re-loading of the URL).

Notification Tracking

In a publish-subscribe environment, the publisher and subscribers are unaware of each other; they are instead integrated by a "broker." Clients (subscribers) ask the broker for messages on a given "topic" (e.g. "tell me when there's an application update available"). From time to time, the publisher sends a single message to the broker (e.g. "app update available at this location"). The publisher may in some cases wish to determine the list of subscribers to whom the message was sent, and the list of those that received it (e.g. from a subscriber's acknowledgment of receipt). The publisher can then, after a certain time, determine "stragglers" by subtracting the list of those that acknowledged from the list of those that were notified, so that the publisher can, for example, resend as needed to make sure every client got the message. However, in one or more embodiments, only the broker knows who the subscribers are.

One or more embodiments intercept the outbound messages from the broker to each subscriber and publish a new message to a new topic on the broker identifying each destination client, subsequently with clients sending acknowledgment to the publisher when they've received the message. The publisher subscribes to notifications from the broker for the new topic ("message-sent"), and undertakes whatever management it needs to achieve its status tracking goals. In essence, such embodiments combine interceptor and mediator design patterns, with the actors in these flows assuming different roles, changing from publisher to subscriber, and from interceptor to publisher, with the broker mediating these communications.

With reference now to FIG. 11, consider that, for example, a weather-notification service may wish to know exactly which customers (that should have received a message about the weather) did not yet receive the published message (e.g. an EAS alert of an approaching tornado). In one or more embodiments: (1) the service is informed with the full list of which subscribers to whom the message was sent by the broker; and (2) upon receipt of the message by the client, the client informs the service with an "acknowledgment." This is useful since after some time T, the service administrator can decide to resend the message to the "stragglers"; i.e., the customers to whom the message was sent, but that still have not acknowledged receipt. The service does not have firsthand knowledge of the list of intended recipients (since that is encapsulated in the broker 807). One or more embodiments address this by introducing an "interceptor" 809 (the rules engine 803 is not employed in the exemplary embodiment of FIG. 11). Interceptor 809 is an additional service that intercepts the individual outgoing messages from the broker 807 and publishes each destination client's identifying information in messages back to the broker on another topic, on which the original publisher is listening.

Now, the publisher 805 is informed, via notification from that topic, of the full list of subscribers 811 to whom the message was sent. Next, each subscriber that receives the message finds the URL of the publishing service in that message, and sends back an acknowledgment to that URL that the message was received. This mechanism provides "notification tracking"

Thus, by way of review, in a "pub-sub" environment, clients subscribe for notifications based on a topic. The publisher publishes information to a topic. A broker in the middle is the actual notification system. The broker fans out the single message, which came from the publisher, to all the listeners listening for (subscribed to) that topic. The servers and the clients are decoupled from each other—they do not need to know about each other—and the broker carries out the management. It is desirable to track the progress of the subscribers, so as to ensure that each customer has the correct software version (or other content). The broker knows each of the individual clients but the server does not. The server does not know to whom a given message is going.

One or more embodiments, as shown in FIG. 11, intercept the outbound messages from the broker using an interceptor component 809 between the broker and each of the messages that go out. The interceptor allows each message to proceed, but takes note of it, and publishes a new message back to the very same broker, which identifies each destination client. An alternative approach is for the broker to expose an API which indicates to whom things are published. However, the former approach is advantageous for architectural reasons, since such indication is not conceptually the responsibility of the broker. Now, the publisher subscribes to the topic to which the interceptor publishes with information about each client to whom a message was sent. This permits explicit tracking of when the messages get sent, and the explicit list of subscribers to whom the message has been sent, which provides more transparency into an otherwise opaque pub-sub system.

One application of this is for the subscribers to send an acknowledgment to the publisher (whose URL could be included in the payload of each message) that they have received the message. This allows the publisher to identify those subscribers that should have received the message, but did not; this example application can be referred to as reliable update tracking, with the general mechanism referred to as Notification Tracking. This aspect combines the interceptor pattern with the mediator pattern (broker).

Thus, in one or more embodiments the actors include the publisher, the broker, and the interceptor. In some cases, if, after a pre-determined amount of time, a client is straggling (i.e., has not sent an acknowledgment to the publisher), the notification can be re-sent in a targeted fashion, i.e. explicitly to each straggler. This can be accomplished when the clients have added a unique identifying filter (e.g. MAC address) to their subscription for messages, subsequently with the publisher sending what are effectively point-to-point messages to the update topic with filters for each of the MAC addresses that have not yet acknowledged.

Thus, some embodiments track notification and update progress (reliability) to provide administrative visibility into in-progress operations. Some such embodiments employ the interceptor mechanism. For example, as part of the business need for reliability, the system should provide "update-content tracking," i.e. a summary view into the progress of the content updating operation for operational purposes. For example, it would be valuable to understand what percentage of clients have been notified to update to new content, and the percentile that have subsequently acknowledged receipt of that notification. In each case, the ability to drill down to specific clients from the summary view is useful for troubleshooting and for re-notification to cover various stragglers (i.e. those that should have sent the acknowledgment but did not).

When a message is sent by the publisher, the broker fans this message out to the appropriate clients. The publisher, however, only knows about the broker. The publisher is not maintaining any parallel list of individual clients (this is consistent with the nature of decoupled architectures, and allows the publisher to offload the scale and design considerations around a client list to the broker, which has already optimized for this). As such, the publisher does not know the specific list of clients that receive messages from the broker. In one or more embodiments a mechanism to provide this addresses the business needs for operational update-content tracking These notifications to interested services address operational update-content tracking, maintaining and exposing status of clients that have been sent the message and those that have acknowledged receipt. Removing clients that have acknowledged from the list of those that were sent the message yields a list of so-called stragglers (those that have not sent acknowledgment after a longer than expected time frame). Those clients can optionally be re-notified, or otherwise troubleshooting and understanding of the operational state can be supported. Eventually, the number of unacknowledged clients approaches zero and the publisher is no longer maintaining the list of subscribers, consistent with the decoupled intent of publish-subscribe architectures.

In at least some embodiments, the incremental polling, content confirmation and notification tracking mechanisms build on the basics of targeted delivery. Likewise, content confirmation and notification tracking build on incremental polling, and each of incremental polling, content confirmation and notification tracking can be used in isolation or in any combination with the others.

Aspects discussed herein can be applied additionally to other areas. For example, client choice of random number within a given range can be applied to randomized polling samples. The content confirmation protocol can be used not only to prescribe content, but to direct actions to be taken by specific clients on an as-needed basis, e.g. collecting a sampling of locally-stored logs, performing backups on a centrally-managed schedule, dynamic ad insertion, and other tasks that are batch in nature and requiring central control. The interceptor mechanism can be used for auditing, heartbeat protocols, general status tracking, and the like.

Given the discussion thus far, and with attention again to FIG. 9, it will be appreciated that, in general terms, an exemplary method, according to an aspect of the invention, includes the step of registering a plurality of subscribers to receive, from a publisher component 805, at client devices 811, via a broker component 807, at least one of messages and content pertaining to a first topic. A further step includes causing each of the subscribers to generate one of N random numbers. A different one of N random numbers is generated by each of the subscribers. In at least some embodiments, this occurs via an agreed-upon protocol between client 811 (subscriber) and server (e.g., on which broker 807 resides). The client 811 (subscriber) sends an acknowledgement to the publisher, to which the publisher replies, advising the client to pick a number between 1 and N and then to subscribe to that as a filter on the first topic. Thus, a still further step includes instructing each of the subscribers to listen only for the at least one of messages and content pertaining to the first topic and corresponding to the one of N random numbers generated by each corresponding one of the subscribers. An even further step includes publishing the at least one of messages and content pertaining to the first topic to those of the subscribers associated with each one of the N random numbers, number by number, until the at least one of messages and content pertaining to the first topic has been published to all of the plurality of subscribers. In one or more embodiments, the steps just described are carried out by publisher component 805 executing on a hardware server 813 interacting with the other components as described—in one or more embodiments, interaction with clients 811 is over network connectivity 817.

It is worth noting than in one or more embodiments, such as those shown in FIGS. 8-11, components 801, 901, 803, 805, 807, 809 are located in a first network node, and the clients are interconnected with the network 817 and located at premises remote from the first network node. In some cases the network is a content network, a non-limiting example of which is a video content network. In some cases the first node is a national data center of the video content network.

In some cases, in the step of causing each of the subscribers to generate the one of N random numbers, the value of N in the N random numbers is generated based on available capacity of at least one of the publisher component 805 and the network 817 interconnecting the publisher component with the subscribers. For example, as described elsewhere herein, in some cases, the value of N is determined from an overall customer population divided by a preferred increment size.

In some cases, the at least one of messages and content includes content. In some cases, as discussed with regard to FIG. 8, the content includes a uniform resource locator identifying a cloud-based user interface. Note that the rules engine and interceptor in FIG. 8 are optional in one or more embodiments pertaining to this aspect.

Furthermore, given the discussion thus far, and with attention again to FIG. 10, it will be appreciated that, in general terms, another exemplary method, according to another aspect of the invention, includes the step of publishing, from a publisher component 805, to a plurality of subscribers at client devices 811, via a broker component 807, at least one of messages and content including a uniform resource locator pointing to a rules engine 803. In one or more embodiments, the step just described is carried out by publisher component 805 executing on a hardware server 813 interacting with the other components as described—in one or more embodiments, interaction with clients 811 is over network connectivity 817.

A further step includes obtaining, at the rules engine 803, from each of the client devices 811, a unique identifier of each of the client devices. In one or more embodiments, the step just described is carried out by rules engine 803 executing on a hardware server 813 interacting with the other components as described—in one or more embodiments, interaction with clients 811 is over network connectivity 817. In some cases, publisher 805 encapsulates the rules engine 803. For example, the publisher and the rules engine could be at the same URL and the publisher and rules engine could include different roles played by the same service.

An even further step includes using the rules engine 803 and the unique identifiers obtained from the client devices 811, determining particular messages and/or content to be delivered to each of the client devices. Refer to the above discussion of content confirmation.

Alternatively, instead of determining particular messages and/or content to be delivered to each of the client devices, the rules engine 803 and the unique identifiers obtained from the client devices 811 direct actions to be taken by specific clients on an as-needed basis, e.g. collecting a sampling of locally-stored logs, performing backups on a centrally-managed schedule, dynamic ad insertion, and other tasks that are batch in nature and requiring central control.

In some cases, in the publishing step, the at least one of messages and content pertain to subscribers to a topic; and, in the using step, the rules engine uses the unique identifiers to specify that the particular messages and/or content to be delivered to each of the client devices vary for at least some of the client devices. Refer to the above discussion of sub-setting within content confirmation.

Furthermore in this regard, some of the client devices are to receive and consume messages and/or content different from the messages and/or content which others of the client devices will receive and consume. In one or more embodiments, this finer-grained message and/or content provision varies based on the MAC (media access control) address of CPE 815 to allow sub-setting. MAC is an exemplary but non-limiting identifying value. Note the distinction between "content," "topic," and "subscription." For example, in one or more embodiments, all clients subscribed to a topic will get a message to re-configure content they receive if and only if that list of content in the message does not match what they already have; otherwise, they proceed as before. Clients acquire (or consume, or use) content, vs. subscribing to a topic.

Consider that in one or more embodiments, a certain number of clients have subscribed to a first topic such as "sports." A combination of filters and topics have been used to define who those subscribers are. In order to carve out a subset of those clients and/or subscribers that are getting sports such that the carved-out subset will receive, e.g., premium level sports such as the Olympics, carve out a subset of subscribers defined by sports and any other filters, e.g., geography, to change the subset of subscribers. In one or more embodiments, sub-setting permits some subscribers to an (unchanging) topic to get different messages or content than the others.

In some instances, the using step includes the rules engine providing at least some of the client devices with a confirmation of current messages and content.

Even further, given the discussion thus far, and with attention again to FIG. 11, it will be appreciated that, in general terms, yet another exemplary method, according to yet another aspect of the invention, includes the step of listening, at an interceptor component 809, for at least one of messages and content pertaining to a first topic published from a publisher component 805 to a plurality of subscribers at client devices 811, via a broker component 807, the least one of messages and content including a uniform resource locator of the publisher component 805. In one or more embodiments, the URL to publisher 805 is included in the originally published message. A further step includes intercepting the at least one of messages and content pertaining to the first topic with the interceptor component 809. A still further step includes re-publishing, with the interceptor component 809, to a second topic different than the first topic, identifying information for the destination subscriber for each of the intercepted messages and/or content pertaining to the first topic. This re-publishing is back to the broker component 807, for transmission to the publisher component 805, to inform the publisher component 805 of the plurality of subscribers 811 to whom the messages and/or content pertaining to the first topic was sent.

In some cases, a further step includes obtaining, at the publisher component 805, acknowledgements from those of the client devices 811 which have received the messages and/or content pertaining to the first topic, via the uniform resource locator of the publisher component 805. Note that this is but one of many ways that the mechanism can be leveraged for operational benefit.

In another aspect, an apparatus includes a memory, and at least one processor coupled to the memory and operative to carry out or otherwise facilitate any one, some or all of the method steps described herein. The apparatus may further include one or more software modules which, when loaded into the memory, configure the at least one processor. The apparatus could be, for example, a publisher apparatus implementing the functionality of publisher 805; a rules engine apparatus implementing the functionality of rules engine 803; a broker apparatus implementing the functionality of broker 807; or an interceptor apparatus implementing the functionality of interceptor proxy 809. The apparatus could implement the functionality of all these components, as shown in FIG. 8. The apparatus could implement the functionality of subsets of these components, as shown in FIGS. 9-11, for example.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
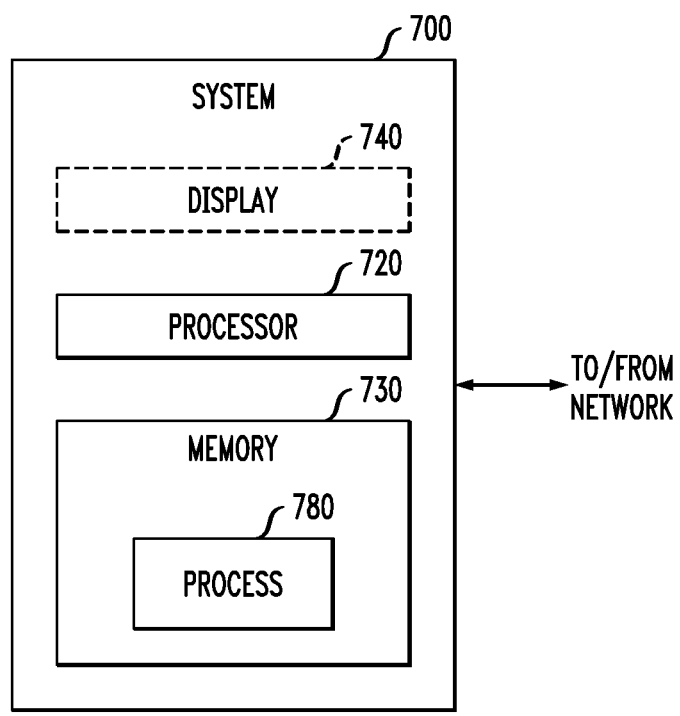
FIG. 7 is a block diagram of a computer system useful in connection with one or more aspects of the invention.

FIG. 7 is a block diagram of a system 700 that can implement at least some aspects of the invention, and is representative, for example, of one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on a virtualized or non-virtualized hardware server implementing one or more of the blocks/sub-blocks 801, 901, 803, 805, 807, 809 and the like, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement blocks/sub-blocks 801, 901, 803, 805, 807, 809 or client 811). The method steps can then be carried out using the distinct software modules of the system, as described above, executing on one or more hardware processors (e.g., one or more hardware processors of server(s) 813 and one or more hardware processors of STB or other CPE 815). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
    registering a plurality of client devices to receive, from a publisher component, via a broker component, at least one of messages and content pertaining to a first topic;
    causing each of said client devices to generate one of N random numbers, a different one of N random numbers being generated by each of said client devices;
    instructing each of said client devices to listen only for said at least one of messages and content pertaining to said first topic and corresponding to said one of N random numbers generated by each corresponding one of said client devices;
    publishing said at least one of messages and content pertaining to said first topic from said publisher component, via said broker component, to those of said client devices associated with each one of said N random numbers, number by number, until said at least one of messages and content pertaining to said first topic has been published to all of said plurality of client devices;
    listening, at an interceptor component, for said at least one of messages and content pertaining to a first topic published from the publisher component to the plurality of client devices, via the broker component, said least one of messages and content including a uniform resource locator of said publisher component;
    intercepting said at least one of messages and content pertaining to said first topic with said interceptor component;
    re-publishing, with said interceptor component, to a second topic different than said first topic, said random numbers corresponding to destination client devices for each of said intercepted at least one of messages and content pertaining to said first topic, thereby informing said publisher component of said plurality of client devices to which said at least one of messages and content pertaining to said first topic was sent;
    obtaining at said publisher component, from each of said client devices that received said at least one of messages and content, one of said N random numbers corresponding to that client device; and
    using said random numbers obtained from said client devices and re-published by said interceptor component, said publisher component determining particular messages and/or content to be re-published to selected ones of said client devices.

2. The method of claim 1, wherein in said step of causing each of said client devices to generate said one of N random numbers, a value of N in said N random numbers is generated based on available capacity of at least one of said publisher component and a network interconnecting said publisher component with said client devices.

3. The method of claim 2, wherein said value of N is determined from an overall customer population divided by a preferred increment size.

4. The method of claim 1, wherein said at least one of messages and content comprises a uniform resource locator identifying a cloud-based user interface.

5. The method of Claim 1, wherein:
    in said publishing step, said at least one of messages and content pertain to a topic; and
    in said using step, said publisher component uses said random numbers to specify that said particular messages and/or content to be delivered to each of said client devices vary for at least some of said client devices.

6. The method of Claim 1, wherein said using step comprises said publisher component providing at least some of said client devices with a confirmation of current messages and content.

7. The method of claim 1, further comprising obtaining, at said publisher component, acknowledgements from those of said client devices which have received said at least one of messages and content pertaining to said first topic, via said uniform resource locator of said publisher component.

8. A publisher apparatus comprising:
a memory; and
at least one processor, coupled to said memory and operative to:
register a plurality of client devices to receive, from said publisher apparatus, via a broker component, at least one of messages and content pertaining to a first topic;
cause each of said client devices to generate one of N random numbers, a different one of N random numbers being generated by each of said client devices;
instruct each of said client devices to listen only for said at least one of messages and content pertaining to said first topic and corresponding to said one of N random numbers generated by each corresponding one of said client devices;
publish said at least one of messages and content pertaining to said first topic to those of said client devices associated with each one of said N random numbers, number by number, until said at least one of messages and content pertaining to said first topic has been published to all of said plurality of client devices;
receive, from an interceptor component, those of said N random numbers that correspond to destination client devices to which said at least one of messages and content pertaining to said first topic was sent;
obtain from each of said client devices that received said at least one of messages and content, one of said N random numbers corresponding to that client device; and
using said random numbers obtained from said client devices and received from said interceptor component, determine particular messages and/or content to be re-published to selected ones of said client devices.

9. The publisher apparatus of claim 8, wherein a value of N in said N random numbers is generated by said at least one processor based on available capacity of at least one of said publisher component and a network interconnecting said publisher apparatus with said client devices.

10. The publisher apparatus of claim 9, wherein said value of N is determined from an overall customer population divided by a preferred increment size.

11. The publisher apparatus of claim 8, wherein said at least one of messages and content comprises a uniform resource locator identifying a cloud-based user interface.

12. An article of manufacture comprising a tangible non-transitory machine readable recordable storage medium with instructions recorded thereon which, when executed by a processor, cause said processor to be operative to:

register a plurality of client devices to receive, from said publisher apparatus, via a broker component, at least one of messages and content pertaining to a first topic;
cause each of said client devices to generate one of N random numbers, a different one of N random numbers being generated by each of said client devices;
instruct each of said client devices to listen only for said at least one of messages and content pertaining to said first topic and corresponding to said one of N random numbers generated by each corresponding one of said client devices;
publish said at least one of messages and content pertaining to said first topic to those of said client devices associated with each one of said N random numbers, number by number, until said at least one of messages and content pertaining to said first topic has been published to all of said plurality of client devices;
receive, from an interceptor component, those of said N random numbers that correspond to destination client devices to which said at least one of messages and content pertaining to said first topic was sent;
obtain from each of said client devices that received said at least one of messages and content, one of said N random numbers corresponding to that client device; and
using said random numbers obtained from said client devices and received from said interceptor component, determine particular messages and/or content to be re-published to selected ones of said client devices.

13. The article of manufacture of claim 12, wherein a value of N in said N random numbers is generated based on available capacity of at least one of said publisher component and a network interconnecting said publisher apparatus with said client devices.

14. The article of manufacture of claim 13, wherein said value of N is determined from an overall customer population divided by a preferred increment size.

15. The article of manufacture of claim 12, wherein said at least one of messages and content comprises a uniform resource locator identifying a cloud-based user interface.

16. The method of claim 7, further comprising the steps of:
generating, at said publisher component, a list of said plurality of client devices to which said at least one of messages and content pertaining to said first topic was sent, said list being generated based on said information re-published to said second topic;
removing, at said publisher component, from said list those of said client devices which have received said at least one of messages and content pertaining to said first topic, based on said acknowledgements obtained via said uniform resource locator of said publisher component; and
re-publishing, from said publisher component, to said client devices remaining on said list after said removing, via said broker component, said at least one of messages and content pertaining to said first topic.

* * * * *